United States Patent [19]
Lucas et al.

[11] Patent Number: 5,953,887
[45] Date of Patent: Sep. 21, 1999

[54] TAGGING APPARATUS

[76] Inventors: Gary H. Lucas; Russell R. O'Rourke, both of Box 279, Cookstown, N.J. 08511

[21] Appl. No.: 09/002,792
[22] Filed: Jan. 5, 1998
[51] Int. Cl.$^6$ .................................................. B65B 35/30
[52] U.S. Cl. ............................................ 53/534; 53/247
[58] Field of Search .................................. 53/135.1, 247, 53/238, 240, 154, 155, 445, 474, 246, 539, 534; 221/211

[56] References Cited

U.S. PATENT DOCUMENTS

| | | |
|---|---|---|
| 2,942,392 | 6/1960 | McCain . |
| 3,580,456 | 5/1971 | Zueger . |
| 3,780,627 | 12/1973 | Roda . |
| 4,574,556 | 3/1986 | Schmidt et al. . |
| 4,947,579 | 8/1990 | Harrison et al. . |
| 4,996,820 | 3/1991 | Harrison . |
| 5,289,666 | 3/1994 | Hamilton . |

FOREIGN PATENT DOCUMENTS 1064888  1/1984  U.S.S.R. ................................ 221/211

*Primary Examiner*—Linda Johnson
*Assistant Examiner*—Matthew Luby
*Attorney, Agent, or Firm*—Rick R. Wascher

[57] ABSTRACT

An apparatus for placing tags into communication with a container. The apparatus includes a frame having a ground engaging end and an upright free end extending from the ground engaging end and at least one tagging head attached to the upright free end. The tagging head further includes a picker arm assembly configured for reciprocal movement between a first tag picking position and a second tag placement position. A cylinder is provided to position the picker arm in either of the first or second positions as the picker arm reciprocates within a J-shaped channel of a cam plate. The apparatus further includes at least one tag reservoir supported by the upright free end of the frame wherein the at least one tag reservoir is configured to hold a tag in substantially the first tag picking position enabling the placement arm assembly to contact and take possession of the tag during use.

25 Claims, 7 Drawing Sheets

TAGGING APPARATUS

BACKGROUND OF THE INVENTION

1. Field of the Invention

The present invention relates generally to apparatuses and devices for inserting tags into, on to, or in communication with flats, trays, pots, or any other apparatus or device used for holding, storing or growing horticultural plants (hereinafter referred to simply as "plant containers"). More particularly, the present invention is directed to an apparatus for automatically inserting tags into, on to, or in communication with plant containers wherein the apparatus is capable of taking possession of a tag withdrawn from a reservoir stack thereof and automatically properly position it with respect to the container.

2. Description of the Related Art

Identification labels are widely used in the nursery and greenhouse industries in order to identify plants contained in a plant container such as a flat, pot, cup or tray. Typically, an identification tag or label is formed from a sheet of thin plastic, which may be ornately or oddly cut or shaped, and generally includes a flag portion extending from a spike portion. The flag portion typically supports plant information such as the plant name, preferred growing conditions, a picture of a plant, etc. and the spike portion is provided to be inserted into the soil of the plant container or structure thereof.

The manual insertion of tags into soil filled plant containers is typically considered a tedious, time consuming job. There are several known apparatuses which are capable of inserting tags into the soil of a plant container and as such comprise the art to which the present invention relates.

U.S. Pat. No. 4,574,556 granted to Schmidt et al. on Mar. 11, 1986 is directed to a label inserting apparatus. The Schmidt et al. apparatus is a device for automatically inserting identification labels in plant containers. The Schmidt et al. device comprises a conveying track for conveying the containers along a predetermined path, a horizontal label storage magazine positioned above the path for holding the labels in a stack, and an insertion mechanism mounted transversely to the outer end of the storage magazine. The insertion mechanism has a vertically reciprocal slide member abutting the outermost label in the label stack. The slide includes a gripping means for gripping the outermost label only and driving it outwardly into a plant container. A control means is provided for causing the labels to be inserted in each plant container.

U.S. Pat. No. 4,947,579 granted to Harrison et al. on Aug. 14, 1990, is directed to a computer-operated, automatic, seedling plant, transplanting machine. U.S. Pat. No. 4,996,820 granted to Harrison Jr. on Mar. 5, 1991, is directed to a tagging machine for seedling transplants. The '579 and '820 patents are related. The '820 patent is a continuation in part of the application which matured into the '579 patent. The tagging portion of the Harrison patents (hereinafter referred to simply as the "Harrison tagger") can be described as an automatic tagging machine where the tags are stacked and retained in individual, vertically extending magazines in the transversely spaced apart array.

As a conveyor indexes a tray having a plurality of plant receiving cells oriented in an array, a tag-picker arm carrying a plurality of elastomeric suction cups picks a tag from the tag magazine and inserts it into the soil-filled cell of the planting tray. The picker arms and suction cups are driven by a common rotary displacement mechanism. The picker arms are constrained to a central rod which pivots through approximately 90 degrees of rotary displacement. The central rod to which the picker arms are attached and constrained also moves upward and down whereby the tags that are extracted from the magazine by the suction cups are rotated to position the spike portion in a downward orientation and the central rod drives them into the soil of the plant container.

U.S. Pat. No. 5,289,666 granted to Hamilton on Mar. 1, 1994, is directed to an apparatus for applying label tags. The Hamilton apparatus can be generally described as a tagging machine capable of automatically inserting label-type tags into selected compartments of a seedling tray as this tray passes under the tagging machine. A cartridge loaded with tags feeds the tags one-by-one to a breach channel. A pair of extractor fingers lifts the tag in the breach channel onto a deflector which deflects the emerging end of the tag between a pair of displacement fingers. Once the displacement fingers have received the tag, they drive the tag back along the channel in the opposite direction to discharge the tag into the seedling tray. As the tag is moved in the tag insertion direction toward the seedling tray and is discharged from the channel the extractor fingers are moved out of the channel to enable the tag to pass by. The fingers are only brought back into the channel to lift the next tag when the displacement fingers return to their tag receding position.

A common problem not addressed by any aforementioned devices is the inability of a tagging machine to operate "on the fly." "On-the-fly" tagging refers to positioning the tagging machine or tagging device in the path of a conveyor shuttling the plant containers and tagging while the containers continuously move. The aforementioned devices and apparatuses comprising the art to which the invention relates require the plant container to be momentarily stopped and indexed into a tag receiving position, wait for the tag to be placed into the container and only then index to the next container cell. Accordingly, since time is of the essence in the growing industry because of the limited window in which plants need to move from the field or greenhouse into the retail market place, a consistent apparatus for tagging "on the fly" without the necessity of stopping and restarting the tagging operation would be highly advantageous.

Yet another drawback of the known tagging machines is the "whipping" of the spike portion of the tag and the deformation of the plastic tag generally, when it is removed from the tag reservoir and held immediately prior to its placement with respect to the plant container. All of the known tagging machines comprising the art to which the invention relates include an elastomeric suction cup for grasping the tag. The vacuum pressure of the suction cup has a tendency to bend the tag from its normal planar state to a slightly "C" shaped configuration. This bending or "bowing" and the associated whipping of the spike portion of the tag when it is withdrawn from the tag reservoir is known to cause the tag to be misplaced or misaligned during placement. In some instances the bent and whipping tag is not able to be placed at all.

As mentioned, tag bending is caused by the vacuum pressure generated within the confines of the suction cup. The rim of the suction cup, therefore, forms a gasket like seal on the tag to enable the vacuum pressure to hold it in place before tagging, which causes the generally pliant tag to be pulled slightly down into the suction cup well. It is at this time that the tag bends in an attempt to form a "C" shape prior to its placement in to the plant container.

Still further, the known tagging machines comprising the art to which the invention relates cannot be considered modular to enable the tag placing portion of the device to be positioned in the path of the plant container, off to one side of the moving plant container path, or both. It should be noted that there are a great number of different plant container geometries being used in the nursery and greenhouse industries and thus versatility in tag placement is necessary to accommodate the variety of containers. For example, the tagging machines comprising the art to which the invention relates do not allow for tagging from the side of the plant container tray because of the need for a support rod for carrying the tag picker arms spaced apart along the support rod. The support rod rotates and undergoes a vertical up and down displacement whereby the picker arms attached thereto experience the same displacement to place the tags. Thus, the restricted vertical movement prevents such a machine from tagging from the side (i.e., parallel to the path of travel) while tagging front or back (ie., perpendicular to the path of travel). Furthermore, the restricted vertical movement of the machines comprising the art to which the invention relates totally prohibits "tagging on the fly" as will be described above and below with respect to the inventive apparatus.

Accordingly, until now, a modular tagging machine capable of taking possession of a plastic tag having a flag end opposite a spiked end and minimize the bending and whipping of the tag while positioning the tag in either the front, back or side of the plant container, and "on the fly" without the need to index the plant container or jog the tagging conveyor to discrete positions by a stopping and starting motion has not been invented.

SUMMARY OF THE INVENTION

The present invention is directed to a tagging machine having an upright frame with spaced apart top and bottom ends where the bottom end can be referred to as the ground engaging end. In the preferred embodiment a plurality of extension arms extend substantially perpendicularly from the upright frame. The extension arms are freely positionable removable along the length of the upright frame. At least one tagging head is also freely positionable and removable along the length of the tagging frame or extension arms. Each tagging head is preferably secured in its installed position by a clamping mechanism or other suitable mechanism capable of temporarily, but rigidly, securing the tagging head to the upright frame or extension arm.

The ability to freely position the extension aims and/or the tagging head(s) virtually anywhere on the upright frame enables the inventive apparatus to be modular. The modularity of the inventive apparatus equates to versatility and makes it particularly useful for placing tags in communication with virtually any plant container geometry.

The modularity of the inventive apparatus further enables tagging on the fly. On the fly tagging must account for the movement of the container during the time the tag is first in contact with the plant container or its contents and the time the tag is actually released by the tagging head after placing it in communication with the plant container. On the fly tagging might require the placement of the tagging head to be set at a compensating angle with respect to the vertical to account for the container movement during the tagging process.

The tagging head is tilted preferably in the direction the container is traveling when tagging on the fly tagging and the tilt angle depends upon the speed of the conveyor carrying the plant containers to be tagged. The tagging head tilt angle should be set so that the tag is vertically positioned with respect to the plant container after the tagging head releases the tag. This angle can be determined by understanding that when a tag contacts a moving plant container it imparts a force against the spike portion of the tag which has a tendency to cause the spike portion to sweep through an arc shaped displacement in a first direction and the flag portion to sweep through a substantially equal arc shaped displacement in a second direction opposite the first direction prior to the time when the tag is released by the tagging head. The tilt angle is preferably the angle that the arc subtends.

In the event the container speed does not match the placement speed of the tag by the tagging head, the tagging head will release the tag when its longitudinal centerline is at an angle with respect to the vertical. The compensation angle is that angle of the tagging head which relieves this angled positioning of the tag with respect to the planting container by virtue of the container movement, and thus the tagging speed should be preselected to correspond with the appropriate compensation angle and container speed.

A tagging head is partially comprised of a tag reservoir formed by a tag chute. The chutes are removably secured to the tagging head by, for example, a pin and slotted hole configuration. The open front of the chute forms the tag reservoir referred to herein. The chute is deigned to provide a three point or three contact support of the tags stacked within the reservoir. This three point support design is unique and provides a tag leveling function.

The width ofthe tag reservoir is adjustable to correspond to the width of the flag portion of the tag. The tag reservoir accepts tags in a stacked arrangement and is configured to be loaded from the open front side of the chute. The bottom of the shoot includes a tag support mechanism which prevents the tags from falling out of the reservoir yet allows individual tags to be withdrawn therefrom during operation.

The preferred chute is sized to allow the spike portion of the tags to protrude from the reservoir. An alternate embodiment of the chute could totally surround the tags placed therein because the tags are withdrawn from the bottom of the stack during use, and the spike portion of the tag would be the leading edge as it is inserted or placed in communication with the planting tray.

In its preferred embodiment, the inventive tagging apparatus is an electro-mechanical, pneumatic device, but it is assumed that hydraulic or electrical servo type mechanisms could be used throughout or in any working portion of the apparatus. A plurality of sensors are utilized when a "stop-start" mode is preferred in order to inform tagging head when to take a tag from the reservoir. The sensors are capable of detecting the presence of a plant container positioned in the tag receiving position. The sensors are also capable of initiating the tagging sequence or actuating the tagging head in either the on the fly or stop and start modes. A control box with switching system translate the signal information from the sensors to the appropriate components of the tagging head, a fluid pressure manifold that drives the cylinder mechanism(s), etc. The switching system, therefore, partially comprises the control box of the present invention, and includes an operator interface for example of the type having model number "OP-620-Operator Panel" or "DV1000" currently sold by PLC Direct. The PLC Direct OP-620 is believed to be a suitable alternate to the DV1000.

The DV-1000 is somewhat limited in its utility, because it's primary use was intended to be a counter/timer interface, but most of the PLC ("programmable logic control" language) code of the present invention is used primarily to control the display. The new OP620 is designed to be an operator interface. Although it only has a two line display and the DV1000 has a four line display, the OP620 has user-programmable and legendable buttons that can be assigned to items that are currently displayed on the screen. The DV1000 has no legendable buttons.

The OP620 has dedicated menu navigation and data entry keys, where in the DV1000 all this is done with PLC code. The OP620 is larger than the DV1000. The OP620 is listed as requiring 2.8 watts, possibly requiring an external power supply if used in a tagger running a DL105 PLC (a preferred embodiment), and will definitely require an external power supply when running in a tagger using a DL204 series of PLC (and alternate embodiment). The OP620 is also NEMA 4 rated, while the DV1000 is NEMA 1.

A cylinder mechanism, preferably a single cylinder which is pneumatic in nature, also partially comprises the tagging head. The cylinder mechanism provides the motive force for the tag placement assembly. In use the user may program the control box, which includes a pre-selected one of the pre-programmed modes set forth in conventional PLC code format depending upon the tagging task at hand.

One extreme of the stroke of the cylinder mechanism is the tag picking position of the picker arm and the other extreme is the tag picker position of the picker arm. When a tag is removed by the picker arm from the bottom of the tag stack the picker arm is substantially parallel with the tag being removed and the reciprocal motion of the cylinder mechanism begins its down stroke driving the picker arm and tag downward until the tag enters into communication with the planting tray. The return stroke of the cylinder causes the picker arm to return to the tag stack. Thus, the picker arm rotates from a tag parallel picking position to a substantially vertical tag placement position. This is accomplished by the J-shaped channel of the cam plate and the cam which slides within the channel when the picker arm rotates as will be described below.

Thus, the preferred embodiment of the placement assembly also includes a cam plate having an upside-down J-shaped slot or channel. A semi-circular cam made of a Teflon or other polyethylene-like material rides within the J-shaped slot and is attached to the picker arm so as to provide a reduced friction glide between the cam plate and the picker arm. A cylinder means drives the cam within the J-shaped slot; at its lowermost position the cam and, thus, the picker arm attached thereto and extending therefrom is in a substantially vertical and parallel position with respect to the slot and the chute in which the tags are stored.

At its uppermost tag-picking position (the position where the picker arm removes a tag from the bottom of the stack contained within the reservoir of the chute), the picker arm is in a more horizontal and perpendicular position with respect to the slot as well as the axis of the reservoir of the chute having the tags stored therein. Thus, reciprocation between a top (i.e. tag-picking) and bottom (i.e., tag placing) position is at least in part accomplished by a cylinder and a push rod which is interpositioned between the cam and cylinder.

The picker arm includes a tag supporting post or post means which is surrounded by an elastomeric suction cup. In the preferred embodiment there are two situated elastomeric cups situated on each picker arm assembly. The post minimizes the tendency of the tag to bow and form a C shape when the tag is in the vacuum grasp of the suction cup.

Another advantage of the present invention is the ability to add more than one tagging head at virtually any user-selected position on the upright frame or any extension arm extending therefrom. In this way, oddly shaped or configured planting trays can be tagged with as much ease as a standard planting tray having a conventional row and column array of cells. For example, in many instances certain growers of horticultural products might use a tray having round or hexagon shaped cells, the cells positioned in a diamond configuration, staggered rows of cells making in-line tagging difficult, or a single row of pots or containers.

It is an object of the present invention to provide an automatic tagging apparatus of the type capable of: taking possession of a tag and placing it into communication with a plant container or inserting it into a planting tray, minimizing the bending of the tag prior to its insertion, tagging on the fly, having modular characteristics and components so that it can accommodate many more planting tray configurations than any other known tagging machine, as well as have a reciprocating stroke from a top and bottom position along a guided groove or track of a device such as a cam plate.

It is a feature of the present invention to provide an automatic tagging apparatus of the type capable of: taking possession of a tag and inserting it into a planting tray, minimizing the bending of the tag, tagging on the fly, having modular characteristics and components so that it accommodates many more planting tray configurations than any other known tagging machine, as well as have a reciprocating stroke from a top and bottom position along a guided groove or track of a device such as a cam plate.

It is an advantage of the present invention to provide an automatic tagging apparatus of the type capable of: taking possession of a tag and inserting it into a planting tray, minimizing the bending of the tag, tagging on the fly, and having modular characteristics and components so that it accommodate many more planting tray configurations than any other known tagging machine, as well as have a reciprocating stroke from a top and bottom position along a guided groove or track of a device such as a cam plate.

These and other objects, features, and advantages shall become apparent after consideration of the scope of the specification including the drawings as well as the claims appended hereto. All such objects, features, and advantages are contemplated and considered to be within the scope of the present invention whose only limitation is the scope of the appended claims, even though such objects, features, and advantages are not specifically set forth herein.

DETAILED DESCRIPTION OF THE PREFERRED EMBODIMENT(S)

Figure 1:
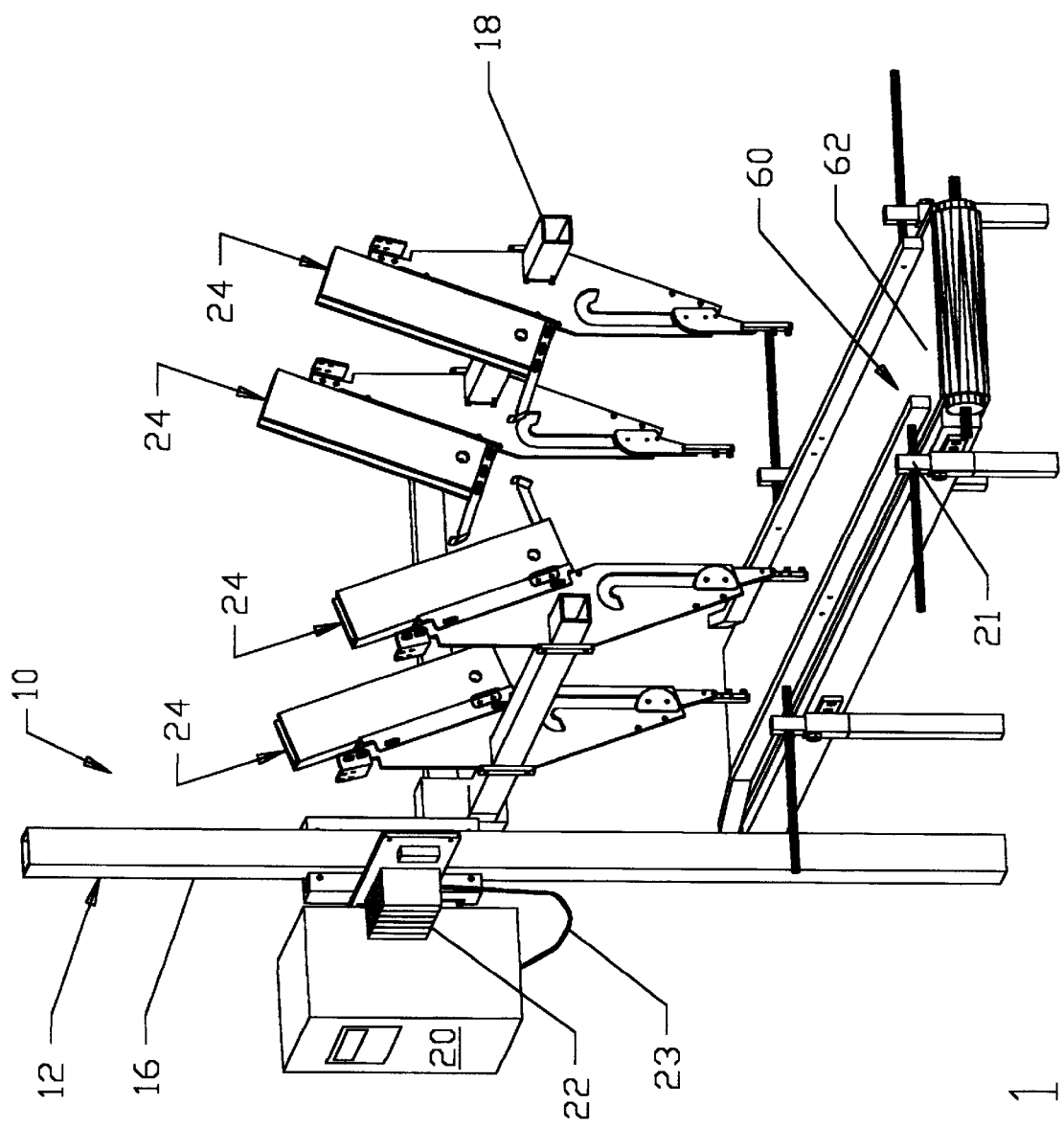
FIG. 1 is an elevated perspective view of a preferred embodiment of the inventive apparatus.
Figure 2:
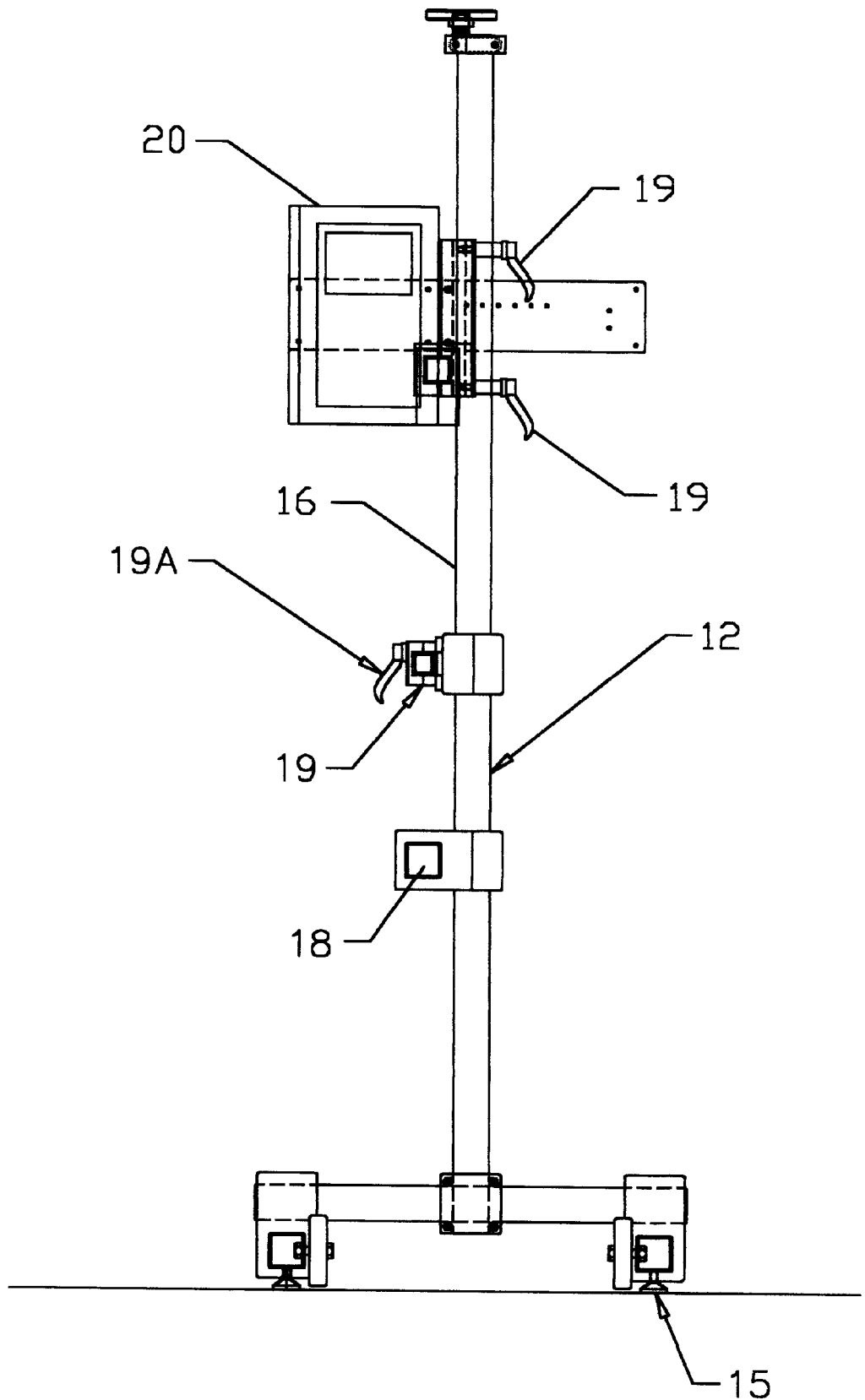
FIG. 2 is an elevated front view of the upright frame component of the embodiment shown in FIG. 1.
Figure 3:
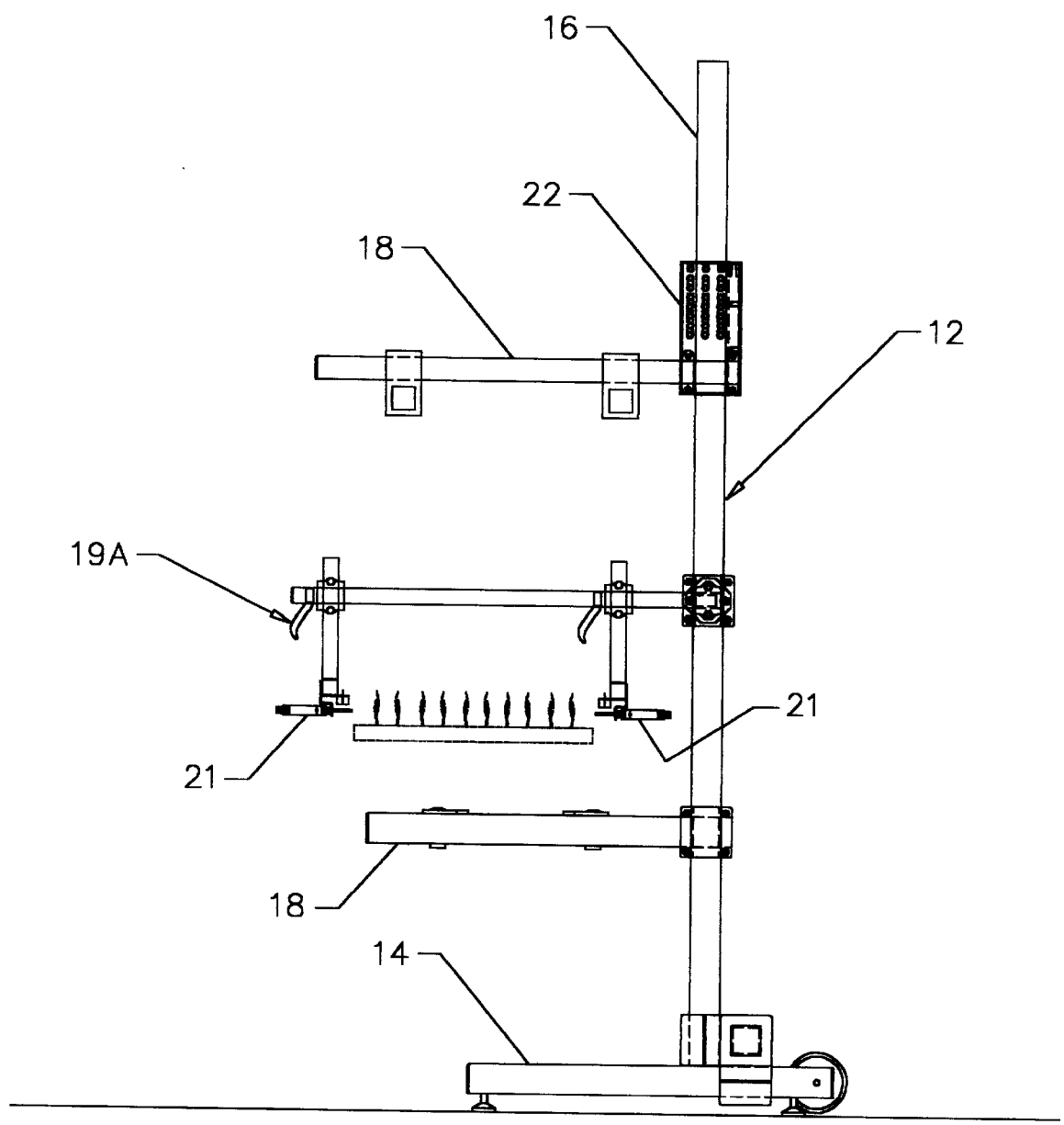
FIG. 3 is a left side view of the frame component shown in FIG. 2.

With reference to FIGS. 1 through 7, and embodiment of the present invention is designated generally by the reference numeral 10 (FIG. 1). As shown in FIGS. 1 through 3, the embodiment of the invention 10 includes an upright frame designated generally by the reference numeral 12. The upright frame 12 includes a ground engaging end 14 having a plurality of leveling feet 15 extending therefrom. Ground engaging end 14 is opposite the free end 16 of the frame 12. Extension arms 18 are preferably secured to the upright frame 12 anywhere along the free end 16. The extension arms 18 are secured to the upright frame 12 by a clamp structure 19 which is tightened by levers 19A. In this manner, if the clamp assembly 19 were loosened by rotating the lever arm 19A, the extension arms may be positioned anywhere along the upright frame.

Also attached to the upright frame 12 is a control box 20 which preferably include the electronic components (not shown) of the invention. The electronic components (not shown) are electrically connected to an optional sensor array including sensors 21, fluid manifold 22 which is communication with the control box 20 and its components for simplicity. Extending from the fluid manifold 22 is pneumatic tubing 23. In this manner, the preferred embodiment of the present invention is an electro-mechanical, pneumatic device wherein the control box stores the programming and electrical components and circuitry capable of actuating and operating the device. The fluid manifold 22 regulates the air flow, pressure, and/or vacuum within the tubing 23 as triggered by the sensors 21 which are provided to detect the presence, or lack thereof, of a planting container or tray 2 having plants 4 situated therein.

Figure 4:
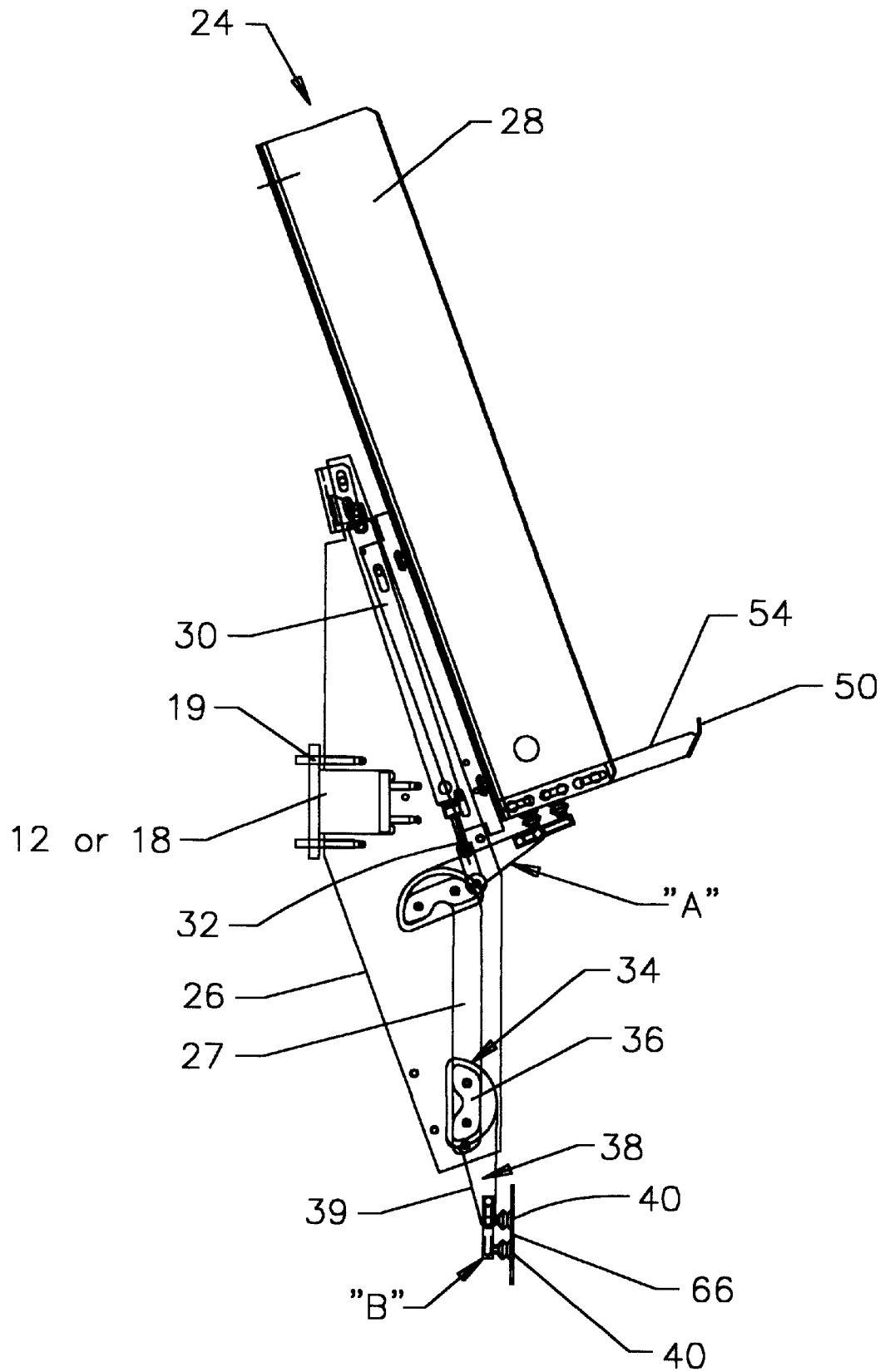
FIG. 4 is a side view of a representative tagger head of an embodiment of the present invention.

With reference to FIGS. 1 and 4 through 7, an embodiment of a tagging head is shown and designated generally by the reference numeral 24. The tagging head 24 includes a cam plate 26 which is preferably secured to the upright frame 12 or extension arm 18 by the aforementioned clamping mechanism 19. The tagging head further comprises a chute 28 for holding and guiding a series of tags to be dispensed by the apparatus. The chute 28 is secured to the cam plate and push-rod assembly by a cooperating pin and slotted hole (socket) structure 29 thereby enabling the chute to be removed and loaded or unloaded and reattached to the cam plate 26 to more fully comprise the tagging head 24. In the preferred embodiment the chute 28 forms an angle alpha with the vertical as shown in FIG. 4.

A cylinder 30 having an associated push-rod assembly 32 is operably attached to a tag placement assembly designated generally by the reference numeral 34. With reference to the placement assembly, a cam 36 resides and travels within the J-shaped cam plate channel 27 of the cam plate 26. The cam 36 includes a ledge 37 and grooved portion 37A (FIG. 6) to secure it in its installed position within the channel 27. A picker arm assembly 38 is attached to the cam 36 on a side opposite the ledge 37 enabling the groove 37A to be interpositioned therebetween so as to constrain the cam 36 and picker arm assembly 38 in the channel 27 of the cam plate 26.

Figure 6:
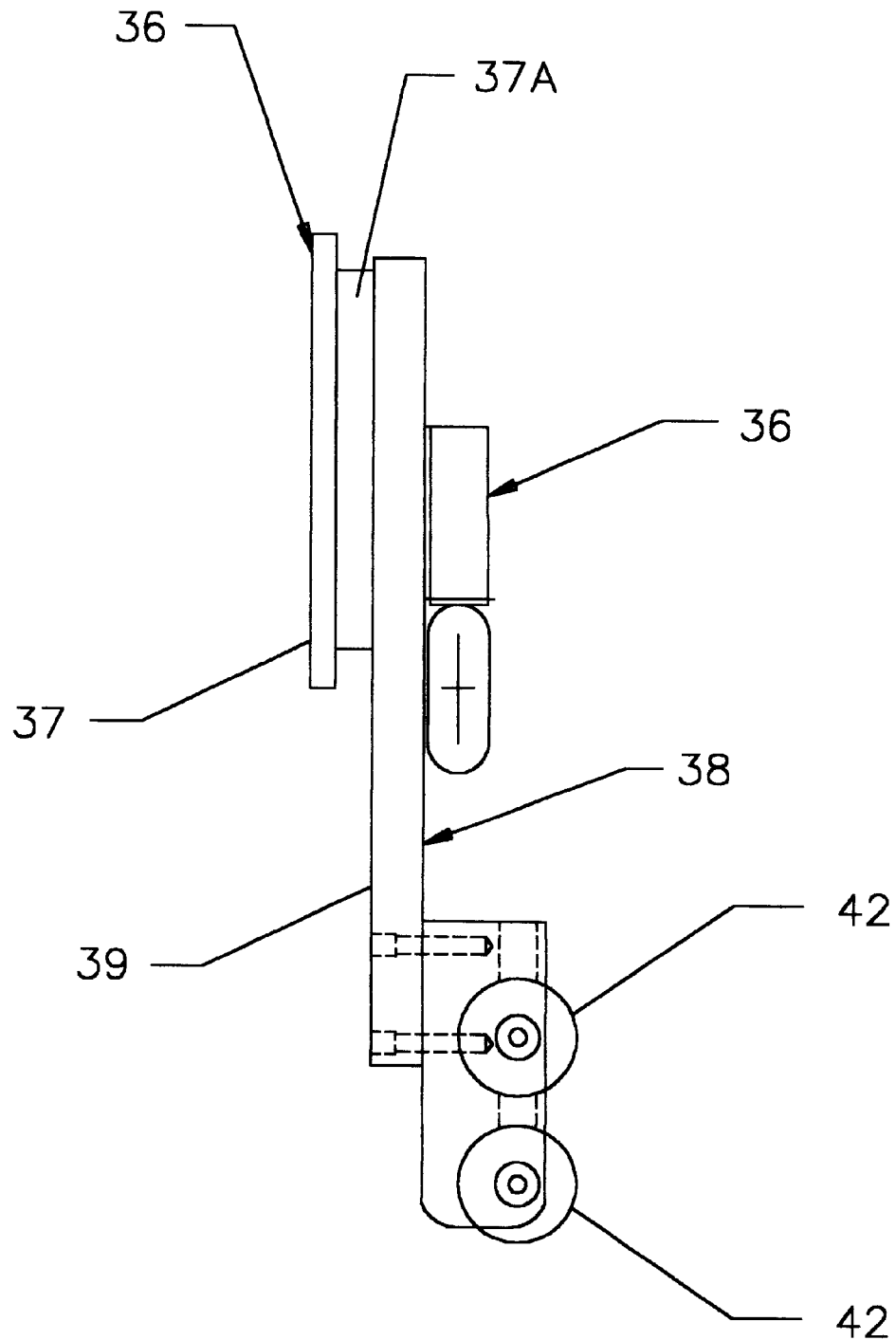
FIG. 6 is a front view of a picker arm assembly component of an embodiment of the present invention.

At least one suction cup (FIGS. 1, 4 and 6 show a pair of suction cups) 40 are disposed on the picker arm 39 and include central pins 42 which protrude from the picker arm 39 within the confines of the suction cups 40. Fluid communication, preferably air, is attached to the picker arm 39 at or near the suction cups 40 and pins 42 so as to provide a suction or vacuum within the suction cups 40.

Figure 5:
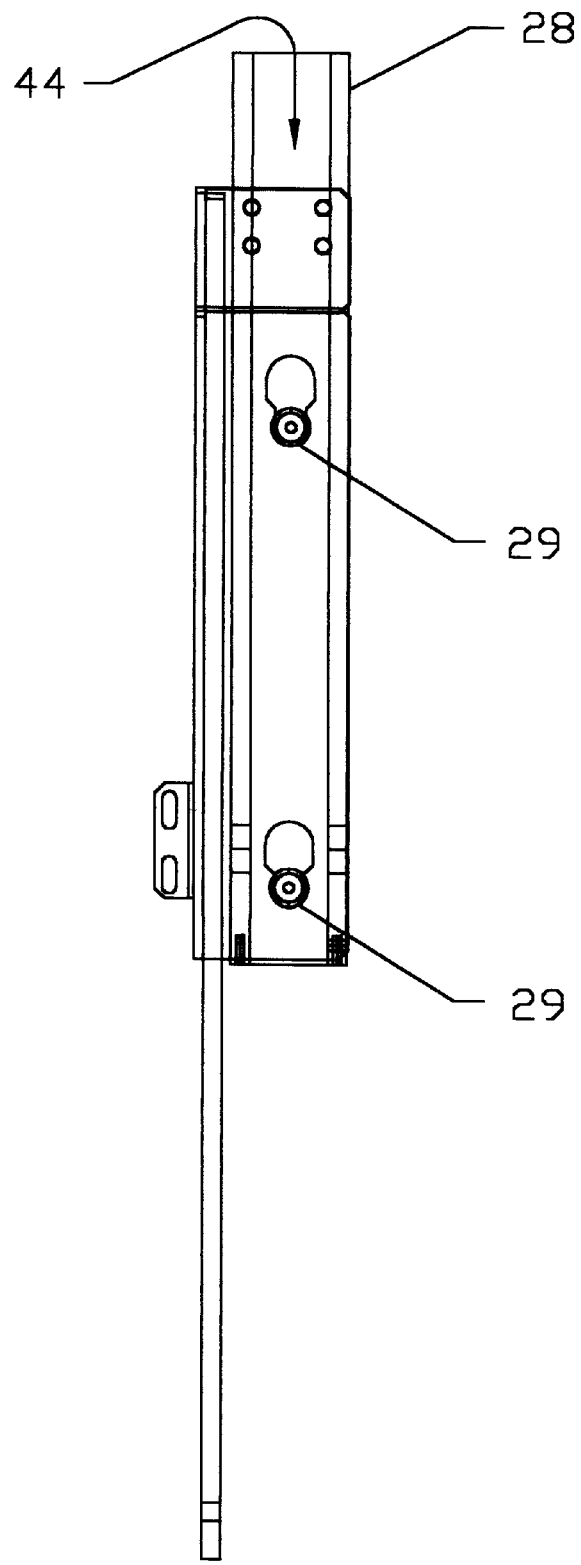
FIG. 5 is a front view of a cartridge component of an embodiment of the present invention.
Figure 7:
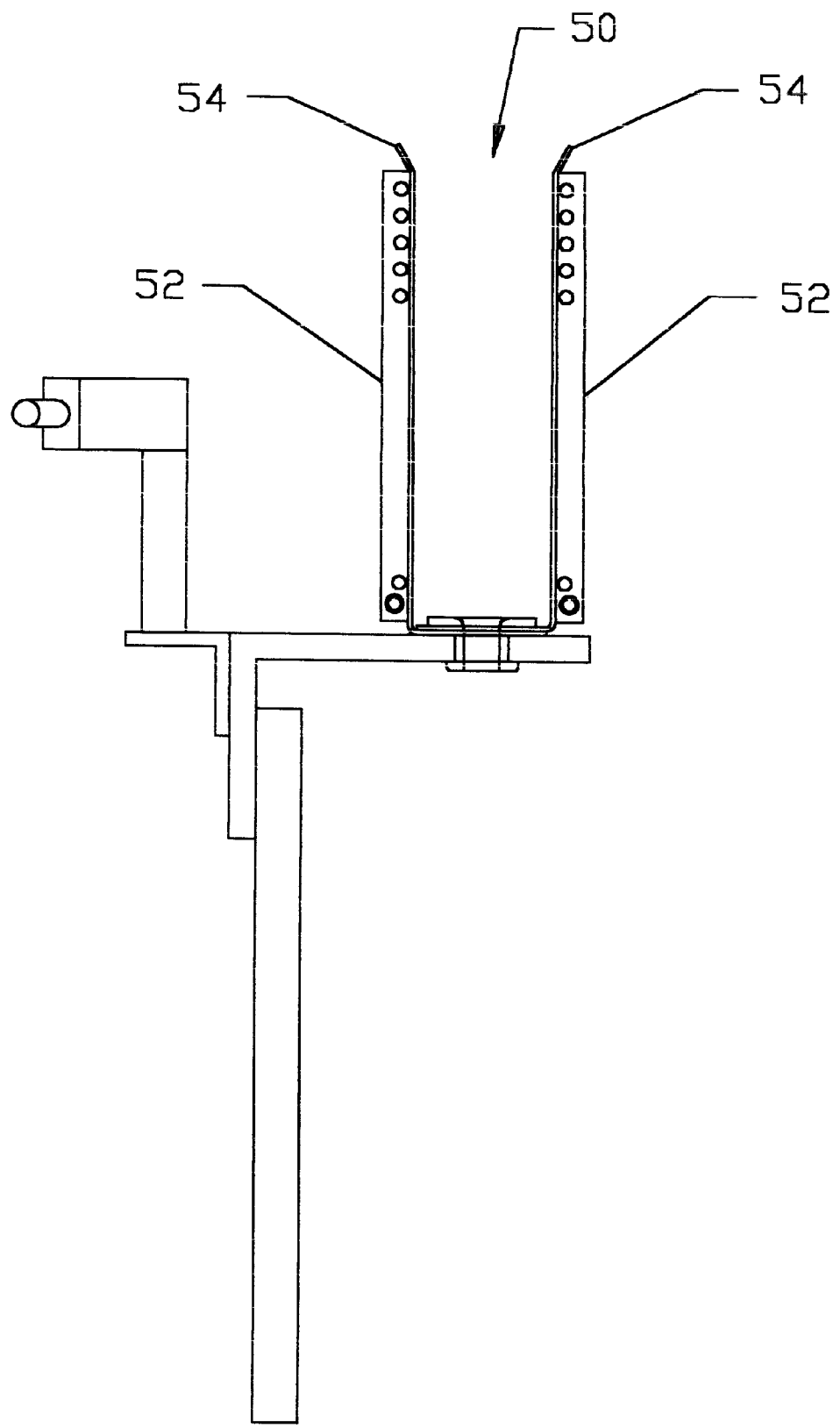
FIG. 7 is a top view of a tag stop support positioned in conjunction with or adjacent to a chute component of the present invention which is shown in yet another figure.

With reference to FIGS. 4, 5, and 7, a tag stop support assembly is shown and designated generally by the reference numeral 50. The tag stop support assembly 50 includes a pair of spaced apart and substantially parallel side rails 52 having walls 54 protruding transversely upward therefrom. The rails and railed walls 52 and 54, respectively, constrain the tags (not shown) residing within the tag reservoir 44 of the chute 28 and prevent them from falling out the bottom end of the chute 28 when they are loaded in it prior to being dispensed or taken possession of by the picker arm assembly 38 during use.

A Mode of Operation

In use, the preferred embodiment of the present invention is positioned adjacent to a conveyor assembly 60 such that the sensors 21 are at or near the moving belt 62 of the conveyor 60. A planting tray 2 having plants 4 positioned therein can be loaded on to the moving continuous belt 62 and shuttled along until the sensors detect its existence on the conveyor. Once the sensors 21 detect the existence of a tray 2 on the conveyor, an electrical signal is transmitted through the control box to the manifold to cause the cylinders 30 to actuate and respond in a piston-like manner.

When actuated the cylinders 30 pull the picker arm 39 upward to position "A" as shown in FIG. 4. At this time a vacuum is created within the suction cups 40 which rest against a tag (FIG. 1) enabling the tag which resides within the reservoir 44 (FIG. 5) to be attracted to and adhere to the suction cups 40 of the picker arm 39. After the suction reaches a certain vacuum pressure as determined and regulated by the manifold 22, the circuitry within the control box causes the picker arm assembly 38 to move downward within the channel 27 of the cam plate 26 which is generally a J-shaped path to a placement position "B" as designated in FIG. 4. In the placement position the tag 66 (FIG. 4) adhering to the suction cups can be inserted or placed into communication with the planting container 2 at which time the vacuum is relieved. When the vacuum is relieved within the suction cups 40, they release the tag 66 enabling it to now reside within the planting container 2 as planned.

Therefore, successive operations of the tagging apparatus of the present invention can place single or multiple tags in various locations depending upon the placement of the tagging heads designated generally by the reference numeral 24 as shown in FIG. 1 enabling the user to tag in various locations, configurations of pots, trays, flats, or on the fly if the tagging heads are angled.

These and other embodiments of the present invention shall become apparent after consideration the scope of the specification and drawings set forth herein. All such embodiments and equivalents thereof are contemplated as part of the present invention whose only limitation is the scope of the appended claims attached hereto.

What is claimed is:

1. A modular apparatus for placing tags into communication with a container, the apparatus comprising:
   a frame having a ground engaging end and a free end extending upward therefrom;
   at least one tagging head moveably attached to the frame and capable of being rigidly secured thereto at any user selectable angle therewith;
   the at least one tagging head further comprises a tag in placement assembly configured for reciprocal movement between a first tag picking position and a second tag placement position and further comprising a picker arm assembly and a cam plate having a J-shaped channel formed therein to enable the picker arm assembly to move between the first and second positions;

cylinder means for moving the picker arm assembly in the first and second positions; and at least one tag reservoir supported by the upright free end of the frame and configured to hold a tag at substantially the first tag picking position enabling the picker arm assembly to contact the tag and take possession of it during operation of the apparatus.

2. The apparatus of claim 1, further comprising:

a sensor system including a control box capable of actuating the cylinder means.

3. The apparatus of claim 1, such that the at least one tagging head further comprises:

a plurality of tagging heads.

4. The apparatus of claim 1, wherein:

the tagging head is freely positionable on the free end of the frame.

5. The apparatus of claim 1, further comprising:

an extension arm extending from the free end of the frame.

6. The apparatus of claim 5, such that:

the at least one tagging head is attached to and supported by the extension arm.

7. The apparatus of claim 1, wherein the picker arm assembly further includes:

a cam configured for reciprocal movement within the channel.

8. The apparatus of claim 7, further including:

a picker arm operably attached to the cam.

9. The apparatus of claim 1, wherein the cylinder means further comprises:

fluid pressure means for supplying fluid pressure to the cylinder means.

10. The apparatus of claim 9, further comprising:

manifold means for regulating the fluid pressure of the fluid pressure means.

11. The apparatus of claim 8, wherein the picker arm further comprises:

at least one post and at least one suction cup surrounding the post in order to minimize the flexion of a tag adhering thereto.

12. The apparatus of claim 11, further comprising:

guide means for stabilizing the picker arm during operation of the apparatus.

13. An apparatus for placing tags into communication with a container, comprising:

a frame;

at least one tagging head supported by the frame, wherein the at least one tagging head further comprises a tag placement assembly, a tag chute for holding and dispensing tags, and cylinder means for reciprocally moving the tag placement assembly within a substantially J-shaped channel of a cam plate and between a first tag picking position and a second tag placement position;

the tag placement assembly further includes a cam configured for reciprocal movement between the first and second positions within the J-shaped channel.

14. The apparatus of claim 13 further comprising:

a sensor system capable of actuating the cylinder means.

15. The apparatus of claim 13, such that the tagging head further comprises:

a plurality of tagging heads.

16. The apparatus of claim 13 wherein:

the tagging head is freely positionable on the upright frame.

17. The apparatus of claim 13, further comprising:

at least one extension arm extending from the upright frame.

18. The apparatus of claim 17 such that:

the at least one tagging head is supported by the at least one extension arm.

19. The apparatus of claim 13 wherein the cylinder means further comprises:

fluid pressure means for supplying fluid pressure to the cylinder means.

20. The apparatus of claim 19 further comprising:

manifold means for regulating the fluid pressure of the fluid pressure means.

21. The at least one tagging head of claim 13, further comprising:

support means for user selectively positioning the at least one tagging head.

22. The apparatus of claim 13, further including:

a cam configured for reciprocal movement within the channel and a picker arm assembly operably attached to the cam.

23. The apparatus of claim 22 wherein the picker arm assembly further comprises:

a picker arm having at least one suction cup mounted thereon and pin means positioned within the at least one suction cup for minimizing the flexion of the tag when the tag is taken into possession by the picker arm.

24. An apparatus having a tag chute for holding and dispensing tags for placement into communication with a container, the apparatus comprising:

a frame;

at least one tagging head supported by the frame, wherein the at least one tagging head further comprises a tag placement assembly, cylinder means for reciprocally moving the tag placement assembly between a first tag picking position and a second tag placement position; and the tag placement assembly further includes a picker arm having at least one suction cup mounted thereon and pin means positioned within the at least one suction cup and protruding from the picker arm for minimizing the flexion of the tag when the tag is removed from the tag chute and taken into possession by the picker arm.

25. The apparatus of claim 24, wherein the at least one tagging head further includes:

a cam configured for reciprocal movement within a channel of a cam plate, and the picker arm is operably attached to the cam and the at least one suction cup is supported and pin means are supported by the picker arm.

* * * * *